June 11, 1968 R. D. RUMSEY 3,387,505
TUNED TORSIONAL VIBRATION DAMPER
Filed Oct. 23, 1965 3 Sheets-Sheet 3
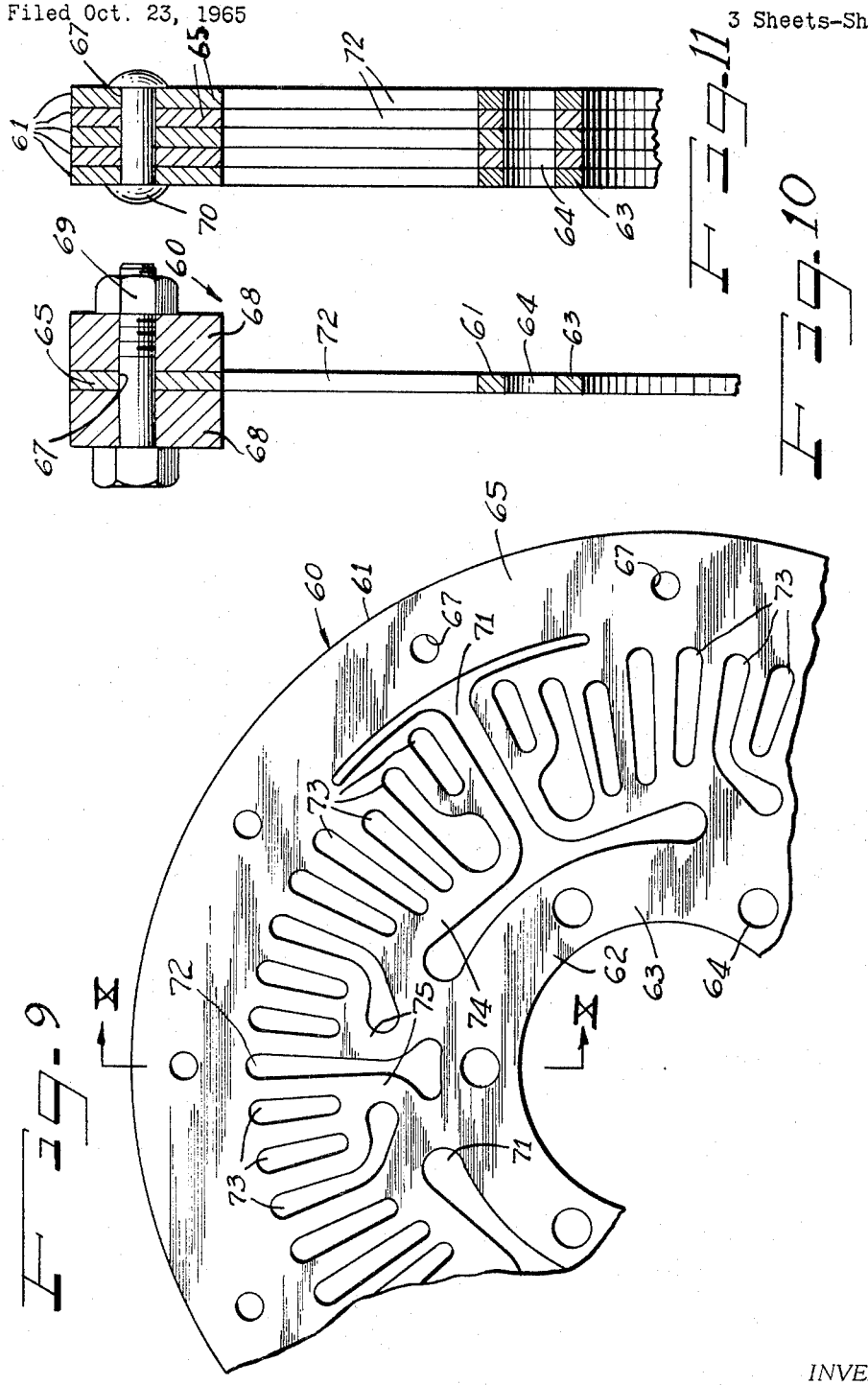
INVENTOR.
Rollin Douglas Rumsey
BY Hill, Sherman, Meroni, Gross & Simpson ATTORNEYS United States Patent Office 3,387,505
Patented June 11, 1968

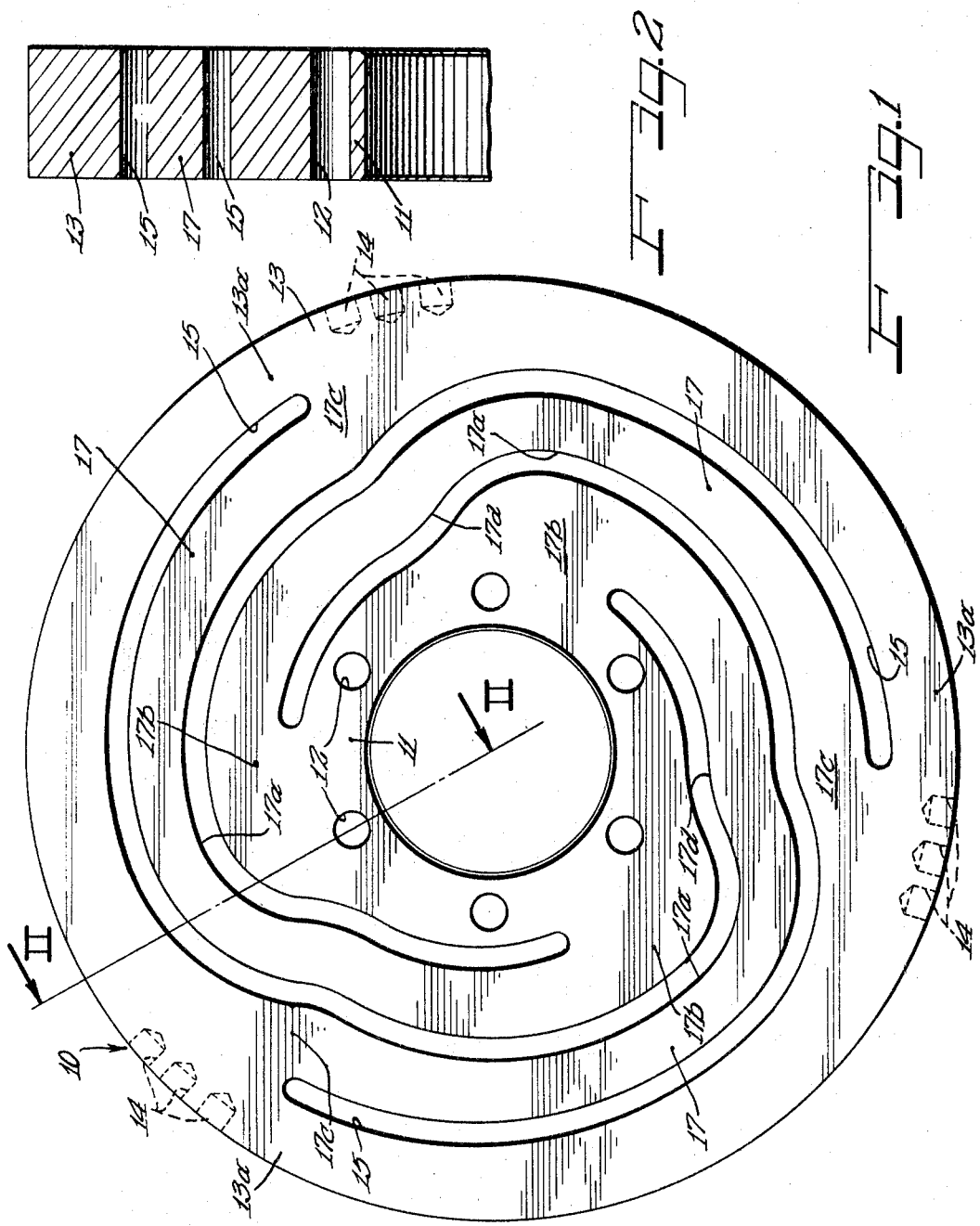

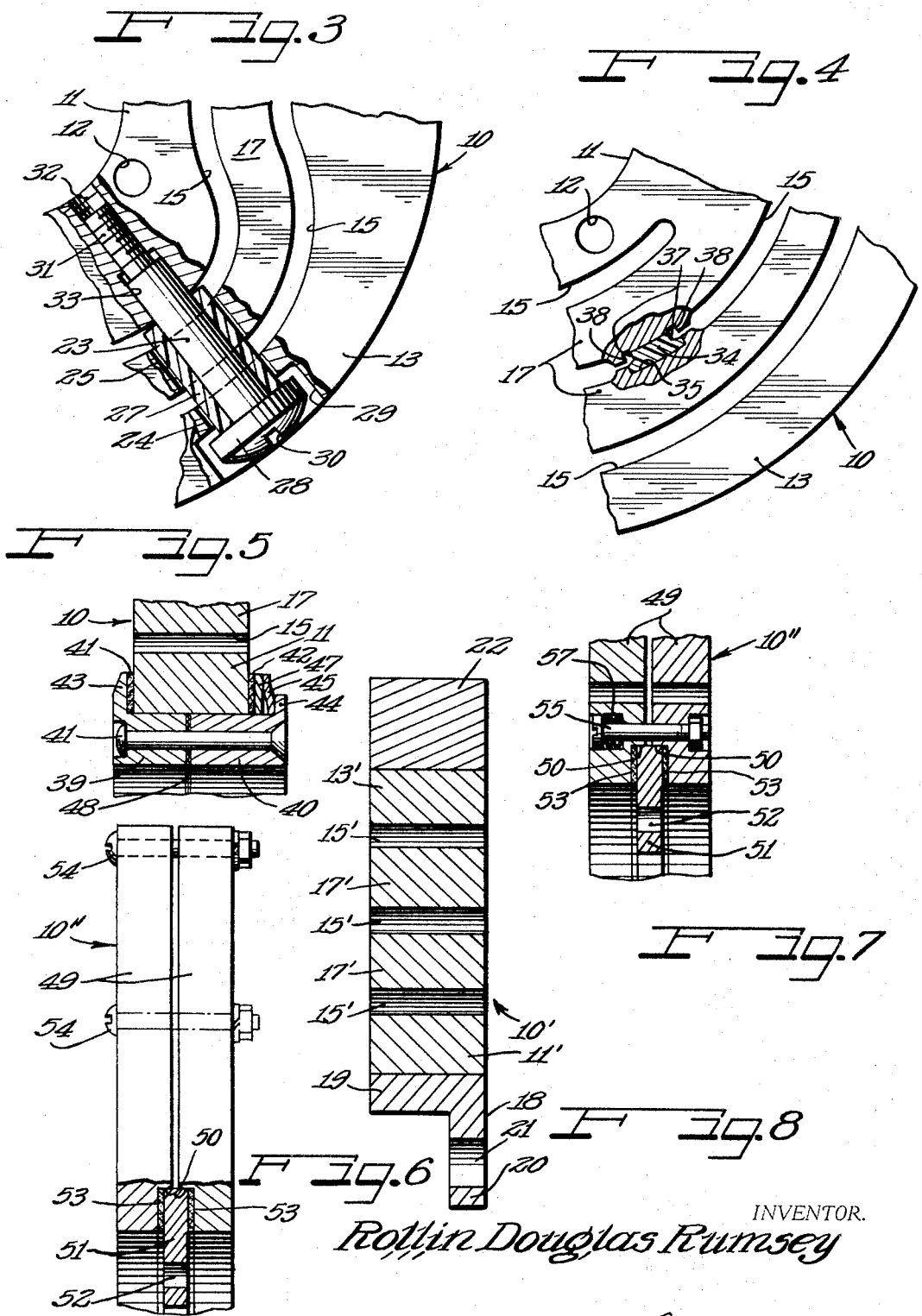

3,387,505
TUNED TORSIONAL VIBRATION DAMPER
Rollin Douglas Rumsey, Buffalo, N.Y., assignor to Houdaille Industries, Inc., Buffalo, N.Y., a corporation of Michigan
Filed Oct. 23, 1965, Ser. No. 503,406
17 Claims. (Cl. 74—574)

ABSTRACT OF THE DISCLOSURE

A torsional vibration damper has radially spaced hub and rim portions relatively torsionally displaceable in operation and connected by bendable spring spokes. Stop means to limit spring windup may be used. A hub member may mount the hub portion, and an inertia ring may be mounted on the rim portion.

---

This invention relates to improvements in torsional vibration dampers, and more particularly concerns tuned torsional vibration dampers of the type especially suitable for crankshaft damping.

Numerous and varied arrangements have heretofore been suggested, and some have proved commercially desirable, for damping torsional vibrations in crankshafts and the like. Principally, dampers for this purpose have comprised a housing or support including a hub to be attached concentrically with the crankshaft and carrying a flywheel mass, with some sort of coupling medium resisting relative rotation of the flywheel mass and the housing or supporting hub. Coupling media may comprise viscous fluid, rubber, compression or tension springs, or combinations of these media. Some of these devices have been rather expensive. In all forms of such prior dampers the actual damping function has been performed by the coupling medium, with the flywheel weight serving solely as an inertia member and otherwise imposing merely a substantial dead load.

An important object of the present invention is to provide a new and improved tuned torsional vibration damper in which a large proportion of the damper weight comprises a damping spring.

Another object of the invention is to provide a new and improved tuned torsional vibration damper in which the material of the flywheel itself serves as the energy absorbing medium.

A further object of the invention is to provide a tuned torsional vibration damper in which a novel spring construction of the flywheel enables a great reduction in weight as compared to prior dampers having substantially the same damping capability.

A still further object of the invention is to provide a new and improved damper construction which not only enables substantial weight reduction but which affords substantial economies in material and cost.

A yet further object of the invention is to provide a new and improved tuned torsional vibration damper construction of simple structure, low cost, small size coupled with high efficiency, and a wide range of adaptability to meet various practical conditions.

Other objects, features and advantages of the present invention will be readily apparent from the following detailed description of certain preferred embodiments thereof taken in conjunction with the accompanying drawings, in which:

FIG. 1 is a side elevational view of a damper embodying features of the invention;

FIG. 2 is a fragmentary sectional detail view taken substantially on the line II—II of FIG. 2;

FIG. 3 is a fragmentary side elevational view of a damper similar to FIG. 1 but showing an angular wind-up limit stop structure;

FIG. 4 is a fragmentary side elevational view of a damper with a modified angular wind-up limit stop structure;

FIG. 5 is a fragmentary radial sectional view through a modified form of the damper showing a frictional fuse structure or excessive stress release means;

FIG. 6 depicts another modified arrangement in a fragmentary edge elevational view, partially in section and embodying another form of excessive stress release means;

FIG. 7 is a fragmentary sectional detail view showing a further modification embodying an excessive stress release fuse;

FIG. 8 is a fragmentary radial sectional detail view showing a composite damper structure embodying features of the invention;

FIG. 9 is a fragmentary side elevational view of a further modified damper construction;

FIG. 10 is a sectional detail view taken substantially on the line X—X of FIG. 9; and FIG. 11 is a sectional view similar to FIG. 10 but showing yet another modification.

On reference to FIGS. 1 and 2, a torsional vibration damper 10 is depicted comprising a monolithic flywheel and damper, that is, the flywheel in substantially its entirety comprises a damping spring. To this end, the damper 10 comprises a circular disc of substantial thickness and suitable material having a central hub portion 11 desirably provided with an annular series of bolt holes 12 to receive securing bolts by which the damper is adapted to be secured in place on the end portion, or against a flange or shoulder, of a rotary member such as a crankshaft to be damped. On its outer circumference, the damper has a continuous integral rim 13 which is desirably provided at suitable intervals with shallow blind end bores 14 to receive balancing lead weight, if needed.

In order to convert most of the weight of the damper 10 to energy-absorbing spring structure, the body of the damper flywheel disc between the hub 11 and the outer rim 13 is subdivided by a plurality, herein three, of elongated slots 15 extending entirely from side to side therethrough, of equal length and symmetrically disposed, whereby to subdivide the body of the flywheel damper disc into three equal, generally involute spring spokes 18 which embody the full width of the disc thickness and affording strength of constant stress for maximum fatigue life. Various desirable tuning characteristics are attainable by suitable variations in length, depth, material and the like to meet known or anticipated damping requirements.

In the representative damper 10, the spokes 17 are in the form of constant strength cantilever beams varying parabolically in depth, i.e., in the radial direction of the disc, from each end to the center. These curved beams are anchored integrally at both ends. On their radial edges, the spokes 17 are shaped according to two respective parabolic variations, resulting in the spokes being of shallowest depth at the substantially midlength thereof and of deepest dimension at each end. Thus, each of the spokes has a substantially shallower midsection 17a and deepens progressively toward its inner end to an anchorage portion 17b integrally joining the hub 11 while progressively deepening toward its outer end to an anchorage portion 17c joining the rim 13, which is desirably of smaller mass than the inner end anchorage portion 17b. That portion of each of the spokes 17 subjacent one of the outer end portions 17c is provided with a compensating incurve 17d maintaining the progressive deepening of the spokes from the shallow portion 17a toward the inner end portion 17b. This configuration of the spokes 17 may have substantially constant bending stress throughout their length in operation.

In order to utilize the maximum percentage of the inertia mass of the damper unit 10 effectively as a spring the rim 13 is of a generally complementary depth configuration relative to the spokes 17. To this end, those parts 13a of the rim 13 along the outer end portions of the respective slots 15 are desirably of shallower depth than the outer end portions of the spokes 17 radially aligned therewith. From the shallow portions 13a, the rim depth progressively increases circumferentially along the respective slots 15 and to the next shallow rim portion 13a. As a result, not only do the spokes bend generally in the direction of rotation responsive to torsional vibrations effecting relative torsional displacement of the hub 11 and the rim but the rim 13 also bends, thereby utilizing to a maximum the mass in the flywheel damper unit for the spring function and involving the lowest possible bending stress in the material. Hence, the damping energy that must be absorbed is dissipated by hysteresis damping within the material of the damper itself without exceeding the fatigue limit of the material.

The least expensive material that may be used in constructing the damper 10 is cast iron of suitable grade. Copper manganese alloy or other desirable metals may be utilized consistent with performance and cost factors, for particular installations. With these different materials a wide range of practical applications can be met. As an example of great versatility, should for any particular size limitation the stress in the material be too low such that insufficient damping might occur utilizing the exact configuration shown in the damper 10, and yet an adequate margin remains below the fatigue limit of the material, additional inertia mass may be provided in the rim 13 while having the spokes 17 proportionately shallower in their configuration.

For certain purposes, it may be desirable to construct the damper of different materials. In an example of such a modified form, a damper 10' is shown in FIG. 8 wherein the spring portion of the flywheel comprising the hub 11', the rim 13' and the involute spring spokes 17' divided by the slots 15' is constructed on the same order as the damper 10 in one integral piece from one material such as a manganese copper alloy. Suitably attached to the hub portion 11' is an annular hub element 18 which may be constructed as a steel stamping, a ductile or mallable iron forging or casting, or the like. While the hub element 18 may be of the same width as the flywheel spring body, it is of generally L-shape cross section including an axially extending flange 19 mounting the hub 11b thereabout, and a radially extending attachment flange 20 having attachment bolt holes 21 therethrough. About the rim 13b may be mounted an annular rim 22 of steel or cast iron, or the like, of whatever mass desired. Attachment of the hub annulus 18 and the rim annulus 22 may be effected by press fit, suitable keying such as knurling or splining, epoxy bonding, and the like.

If there is liability of excessive stresses occurring in the damper under transient or unusual torque conditions suitable stops on angular windup between the hub and rim or between the spring spokes may be installed. For example, in FIGURE 3 the flywheel damper unit 10 is shown as provided with a stop pin 23 of suitable material and diameter to withstand the shear stresses to which subjected. This stop pin is mounted radially through aligned stop wall bores 24 and 25 in respectively the rim 13 and the associated spoke 17 and of predetermined larger diameter than the pin 23 to afford the desired maximum amplitude of windup before the stop walls strike the pin. For shock absorption, a buffer bushing 27 of resilient material such as rubber or plastic is mounted about the pin 23 within the stop bores 24 and 25 and held against axial outward displacement by a head 28 on the outer end of the pin accommodated within a counterbore clearance 29 in the outer edge of the rim 13. For convenience in assembly the head 28 may have a screwdriver slot 30 whereby a reduced diameter threaded inner end portion 31 of the pin is readily adapted to be screwed into a threaded bore 32 axially aligned with the stop bores 24 and 25 and with a counterbore 33 into which the inner end portion of the stop pin 23 adjacent to the threaded portion is received in snug fit. As many of the stop pins 23 as deemed desirable, taking into account the severity of the operating conditions, may be utilized. Generally one such stop pin for each of the spokes 17 will serve the purpose.

In another windup stop construction, as depicted in FIG. 4, a stop key or insert 34 may be provided for one or each of the spokes 17. This stop key 34 is mounted in, or in association with, the inner edge of the spoke to be controlled and desirably comprises a preformed tough, shock resistant material of high shear strength, such for example, as one of the plastic or reinforced plastic materials having the desired characteristics, among which nylon is representative. The key member 34 is mounted in a key seat 35 located approximately midway the length of the associated spoke 17 to be controlled and extends across the separating slot 15. Oppositely generally circumferentially facing stop shoulders 37 of the key member 34 normally oppose respective rigid stop shoulders 38 provided on the opposite side of the slot 15 from the seat 35.

Allowable windup travel in either direction is thus limited by the predetermined spacing between the respectively opposed shoulders 37 and 38.

To meet conditions involving unusual torque loads which might impose excessive spring stresses in the damper, damper coupling means may be employed acting as a safety fuse. In one such arrangement, as shown in FIG. 5, the damper 10 may be provided with a coupling hub assembly including a pair of complementary hub rings 39 and 40 assembled together and mounting the hub portion 11 of the damper disc 10, with retaining rivets 41 at spaced intervals between mounting screw holes retaining the assembly for shipment. A predetermined torque release coupling between the coupling hub and the damper disc is provided by respective coupling disc rings of friction material 41 and 42 mounted on or at least bearing against the respective opposite marginal faces of the integral disc hub 11. Compressively thrusting against, and if desired alternatively carrying the friction ring 41 is a radial flange 43 on the hub ring 39. Thrusting toward the opposite friction ring 42 is a compression flange 44 on the hub ring 40. Strong yieldable pressure is exerted by the flange 44 against the friction ring 42 through a stiff cupped spring ring 45 engaging the flange and thrusting against a washer 47 bearing against the friction ring 42. To avoid overstressing the friction clutch suitable shims 48 may be inserted in the joint between the hub rings 39 and 40.

Another frictional fuse arrangement, as shown in FIG. 6, a damper 10" comprises two annular spring flywheel disc members 49 of similar, complementary form which may individually be about half as thick as the damper 10 and may be adapted for conditions requiring greater damping constant but liable to impose excessive torque loads resulting in damaging spring stresses. Each of the damper discs is constructed similarly to the damper disc 10 but has in one side of its inner margin a respective rabbet groove affording an annular radially inwardly facing seating shoulder 50 to engage the perimeter of a hub disc 51 having means such as bolt holes 52 by which it is adapted to be secured to a rotary member such as a crankshaft to be damped. Engaged between the seating margin of the hub disc 51 and the axially facing surfaces of the spring damper discs 49 within the rabbet grooves are respective friction facing disc rings 53 serving as frictional fuses under clamping pressure as effected by means such as bolts 54 securing the damper discs 49 in opposed concentric relation. By means of the bolts 54 a desired compressive force may be effected through the inner marginal flanges of the damper discs compressively against the friction rings 53.

In FIG. 7 is shown an arrangement in which the damper assembly 10″ is substantially the same as and functions similarly as the form of FIG. 6 except that additionally, or alternatively, screws or bolts 55 are employed to secure the hub portions of the spring flywheel damper discs 49 in place onto the seating margin of the hub disc 51. In this instance the heads and securing nuts of the bolts 55 are received in counterbores at the outer ends of the bolt holes through the hub portions of the discs 49. Further, overload safety means in the form of spring structure 57 may be engaged with the bolt heads to prevent overtightening while nevertheless attaining efficient frictionally releasable fuse binding in the friction coupling.

In all forms of the frictional fuse or clutch arrangement in FIGS. 5, 6 and 7, the friction material serves, in effect, as a solid coupling, enabling the damping spring structures of the flywheel disc to function within their stress limits to damp torsional vibrations, and releasing only when excessive stresses are reached in the spring structure, thereby preventing fatigue failure and limiting wear on the frictional material. In other words, all of the damping is desirably accomplished by the metal spring structure of the flywheel rather than frictional energy dissipation through relative rubbing against the friction material by slippage of the flywheel mass on the hub disc. A friction material is utilized which will withstand a full range of adverse temperature and other environmental conditions such as oil, water, dryness, dampness and other adverse factors, and of which polytetrafluorethylene (obtainable on the market as Teflon) is a desirable example.

In FIGS. 9 and 10 a damper construction 60 is shown which lends itself especially to low cost manufacture. To this end a damping spring disc 61 is adapted to be made as a stamping from suitable heavy gauge material and comprises a circularly continuous hub 62 about a central aperture 63, as desired, and having suitable bolt holes 64 therethrough. Defining its outer perimeter, the disc 61 has a circumferentially continuous rim portion 65 which is desirably provided with a spaced series of bolt holes 67 therethrough by which one or more annular inertia masses or rings 68 are adapted to be secured in face-to-face relation to the rim as by means of bolts 69. Various tuning characteristics may be attained by suitable variations in the inertia masses 68.

In another desirable arrangement, as depicted in FIG. 11, a concentric stack of a suitable number of the one piece damper discs 61 may be secured together in laminar relation as by means of rivets 70 extending through the holes 67 and whereby sufficient mass for particular requirements is afforded in the laminated rim portion of the composite assembly.

Damping is effected by spring spokes integrally formed in an annular area intermediate the hub 62 and the rim 65 by a pattern of slots. This pattern may vary substantially to attain various tuning characteristics. In the example shown, in each approximately one-third segment of the damper disc 61 a generally H-shaped slot has elongated slot portions contiguous to respectively the hub 62 and the rim 65 and is circumferentially spaced from a radially elongated slot 72 having its outer end contiguous to the rim 65 and its inner end enlarged and contiguous to the hub 62, with a pattern of spaced, generally radially extending slots 73 of various shapes intervening between the slots 71 and 72 and subdividing the annular intermediate area into perforated spoke configurations 74 and 75. Through this arrangement, the several spoke configurations 74 and 75 afford a tuned torsional spring windup effect similar to that attained with the damper 10 for damping torsional vibrations.

It will be understood that modifications and variations may be effected without departing from the scope of the novel concepts of the present invention.

I claim as my invention:
1. A torsional vibration damper of the character describing comprising:
    a structure of substantial thickness and diameter having a hub portion and a rim portion spaced apart radially,
    said hub portion and said rim portion being relatively torsionally displaceable in operation of the damper,
    and vibration damping bendable spring spokes connecting said hub and rim portion and having a pattern of slots therebetween in an annular area intermediate said hub and rim portions so that said portions are relatively torsionally movable by bending of said spring spokes generally in the direction of rotation.
2. A damper as defined in claim 1, in which said rim has vibration damping spring characteristics supplemental to said spring spokes.
3. A torsional vibration damper as defined in claim 1 comprising a flywheel disc having:
    hub and rim portions connected integrally by vibration damping spring spokes,
    and a hub member mounting said hub portion.
4. A torsional vibration damper of the character described comprising:
    a disc of substantial thickness having a hub portion and a rim portion,
    and a plurality of integral involute vibration damping spring spokes connecting said hub portion and said rim portion and varying in depth from end to end.
5. A vibration damper as defined in claim 4 in which said spokes are intermediately of less depth than in their respective end portions.
6. A damper as defined in claim 4 in which the hub end portions and the rim end portions of different spokes oppose an intermediate portion of another spoke in relatively offset relation and said intermediate portion has an indented radial configuration.
7. In a monolithic torsional vibration damper disc having a hub portion and a rim portion,
    a plurality of narrow elongated slots symmetrically disposed and extending from side to side through the disc with their respective opposite ends terminating adjacent to said hub and adjacent to said rim,
    said slots separating said disc between said hub and rim portions into a plurality of cantilever beam damper spring spokes varying parabolically from each end toward the center thereof.
8. In a monolithic torsional vibration damper disc having a hub portion and a rim portion,
    a plurality of narrow elongated slots symmetrically disposed and extending from side to side through the disc with their respective opposite ends terminating adjacent to said hub and adjacent to said rim,
    said slots separating said disc between said hub and rim portions into a plurality of cantilever beam damper spring spokes varying parabolically from each end toward the center thereof,
    and said rim comprising respective damping springs of narrowest width aligned with the rim ends of said spokes and progressively deepening along the disc perimeter and following the respective spoke separating slots to the next adjacent spoke rim end in each instance.
9. A torsional vibration damper comprising:
    a concentric stack of discs each of which has a hub portion and a rim portion,
    an intermediate annular portion of each disc having a pattern of slots therethrough subdividing it into vibration damping spring spokes,
    and means securing the rim portions of the discs together.
10. A combination flywheel and torsional vibration damper comprising:
    a flywheel disc of substantial thickness and diameter having a hub portion and a rim portion, a pattern of slots subdividing the disc between said hub and rim portions into vibration damping spring spokes having their respective inner ends adjacent to said hub portion and their outer ends adjacent to said rim portion, and means in said rim portion adjacent to said outer ends of the spokes for balancing the flywheel disc.

11. A combination flywheel and torsional vibration damper comprising:
 a flywheel disc of substantial thickness and diameter having a hub portion and a rim portion,
 a pattern of slots subdividing the disc between said hub and rim portions into a plurality of involute vibration damping integral spring spokes having their respective inner ends connected to said hub portion and their outer ends connected to said rim portion, and limit stop means carried by the disc operative to limit spring windup and thereby prevent overstressing of the spring spokes.

12. A damper as defined in claim 11, in which said limit stop means comprise radial pin means extending in clearance relation through said rim and said spokes and anchored in said hub.

13. A damper as defined in claim 11, in which said limit stop means comprise a shock absorbing key member seated fixedly at one side of one of said slots and having shoulder means opposing normally spaced stop shoulder means on the disc on the opposite side of said slot and located intermediately along one of said spokes.

14. A torsional vibration damper comprising a flywheel disc having:
 hub and rim portions connected integrally by vibration damping spring spokes,
 and an inertia ring mounted on said rim portion.

15. A torsional vibration damper comprising:
 a flywheel disc having hub and rim portions connected integrally by vibration damping spring spokes,
 a hub member,
 and a frictional fuse coupling connecting the hub member and said hub portion and normally solidly retaining the hub member and flywheel disc coupled for torsional vibrational spring action of said spring spokes but functioning to release the hub member and flywheel disc for relative torsional movement in the presence of excessive torque loads to prevent overstressing of said spring spokes.

16. A damper as defined in claim 14, in which said hub member has radial flanges, said hub portion is seated between said flanges, and friction material is clampingly gripped between said flanges and said hub portion.

17. A damper as defined in claim 14, including a second similar flywheel disc having a hub portion and a rim portion connected by involute vibration damping springs, said hub member comprising a disc having a margin between the hub portions of said flywheel discs, frictional material interposed between said hub disc margin and said hub portions, and means securing said flywheel discs clampingly together onto said hub member margin.

References Cited

UNITED STATES PATENTS 3,285,096  11/1966  O'Connor _____ 74—574

FRED C. MATTERN, JR., *Primary Examiner.*

W. S. RATLIFF, *Assistant Examiner.*